US012370813B2

(12) United States Patent
Maezawa

(10) Patent No.: US 12,370,813 B2
(45) Date of Patent: Jul. 29, 2025

(54) DRYING APPARATUS AND IMAGE FORMING APPARATUS CAPABLE OF IMPROVING HEAT CONDUCTIVITY AND ABRASION RESISTANCE OF HEAT-TRANSFER PORTION

(71) Applicant: KYOCERA Document Solutions Inc., Osaka (JP)

(72) Inventor: Nobuhiro Maezawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 158 days.

(21) Appl. No.: 18/514,191

(22) Filed: Nov. 20, 2023

(65) Prior Publication Data

US 2024/0165971 A1 May 23, 2024

(30) Foreign Application Priority Data

Nov. 21, 2022 (JP) ................................ 2022-185446

(51) Int. Cl.
*B41J 11/00* (2006.01)
*B41M 7/00* (2006.01)

(52) U.S. Cl.
CPC ........ *B41J 11/00244* (2021.01); *B41M 7/009* (2013.01)

(58) Field of Classification Search
CPC ............ B41J 11/00244; B41J 11/00216; B41J 11/0024; B41M 7/009
See application file for complete search history.

(56) References Cited

FOREIGN PATENT DOCUMENTS

JP 2010125830 A * 6/2010

* cited by examiner

*Primary Examiner* — Bradley W Thies
(74) *Attorney, Agent, or Firm* — Alleman Hall & Tuttle LLP

(57) ABSTRACT

A drying apparatus includes a heater and a heat-transfer portion. The heat-transfer portion comes into contact with a second surface of a belt-like medium to transmit thermal energy supplied from the heater to the medium, the second surface being a surface on a back side of a first surface of the medium onto which ink is ejected. Further, the heat-transfer portion includes a base material portion, a first layer portion, and a second layer portion. The base material portion is provided closer to an opposing surface that opposes the heater than a contact surface that comes into contact with the medium. The first layer portion forms the contact surface and has higher abrasion resistance than the base material portion. The second layer portion is provided between the first layer portion and the base material portion and has higher heat conductivity than the base material portion.

7 Claims, 8 Drawing Sheets

DRYING APPARATUS AND IMAGE FORMING APPARATUS CAPABLE OF IMPROVING HEAT CONDUCTIVITY AND ABRASION RESISTANCE OF HEAT-TRANSFER PORTION

INCORPORATION BY REFERENCE

This application is based upon and claims the benefit of priority from the corresponding Japanese Patent Application No. 2022-185446 filed on Nov. 21, 2022, the entire contents of which are incorporated herein by reference.

BACKGROUND

The present disclosure relates to an inkjet image forming apparatus and a drying apparatus provided in the image forming apparatus.

In an image forming apparatus which ejects ink toward a medium such as a plastic film, the medium is heated for drying the ink ejected onto the medium. For example, the image forming apparatus includes a heat-transfer portion which comes into contact with a back surface of the medium to transmit thermal energy supplied from a heater to the medium.

SUMMARY

A drying apparatus according to an aspect of the present disclosure includes a heater and a heat-transfer portion. The heat-transfer portion comes into contact with a second surface of a belt-like medium that has been drawn out from a supply source of the medium by a take-up portion which takes up the medium, to transmit thermal energy supplied from the heater to the medium, the second surface being a surface on a back side of a first surface of the medium onto which ink is ejected. Further, the heat-transfer portion includes a base material portion, a first layer portion, and a second layer portion. The base material portion is provided closer to an opposing surface that opposes the heater than a contact surface that comes into contact with the medium. The first layer portion forms the contact surface and has higher abrasion resistance than the base material portion. The second layer portion is provided between the first layer portion and the base material portion and has higher heat conductivity than the base material portion.

An image forming apparatus according to another aspect of the present disclosure includes the drying apparatus, the take-up portion, and an ejection portion. The ejection portion ejects ink toward the first surface of the medium drawn out from the supply source.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments of the present disclosure will be described below with reference to the accompanying drawings. It is noted that the following embodiments are examples of embodying the present disclosure and do not limit the technical scope of the present disclosure.

First Embodiment

Figure 1:
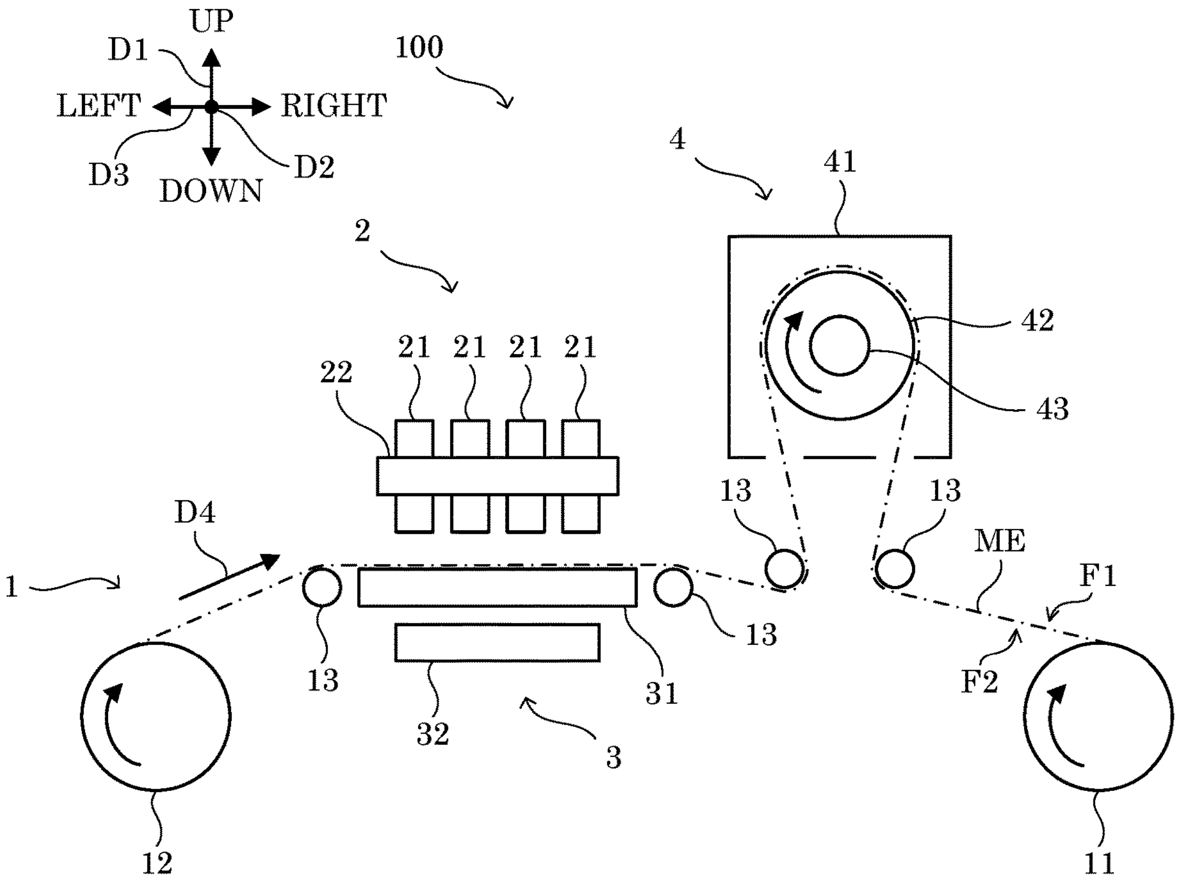
FIG. 1 is a diagram showing a configuration of an image forming apparatus according to a first embodiment of the present disclosure.
Figure 2:
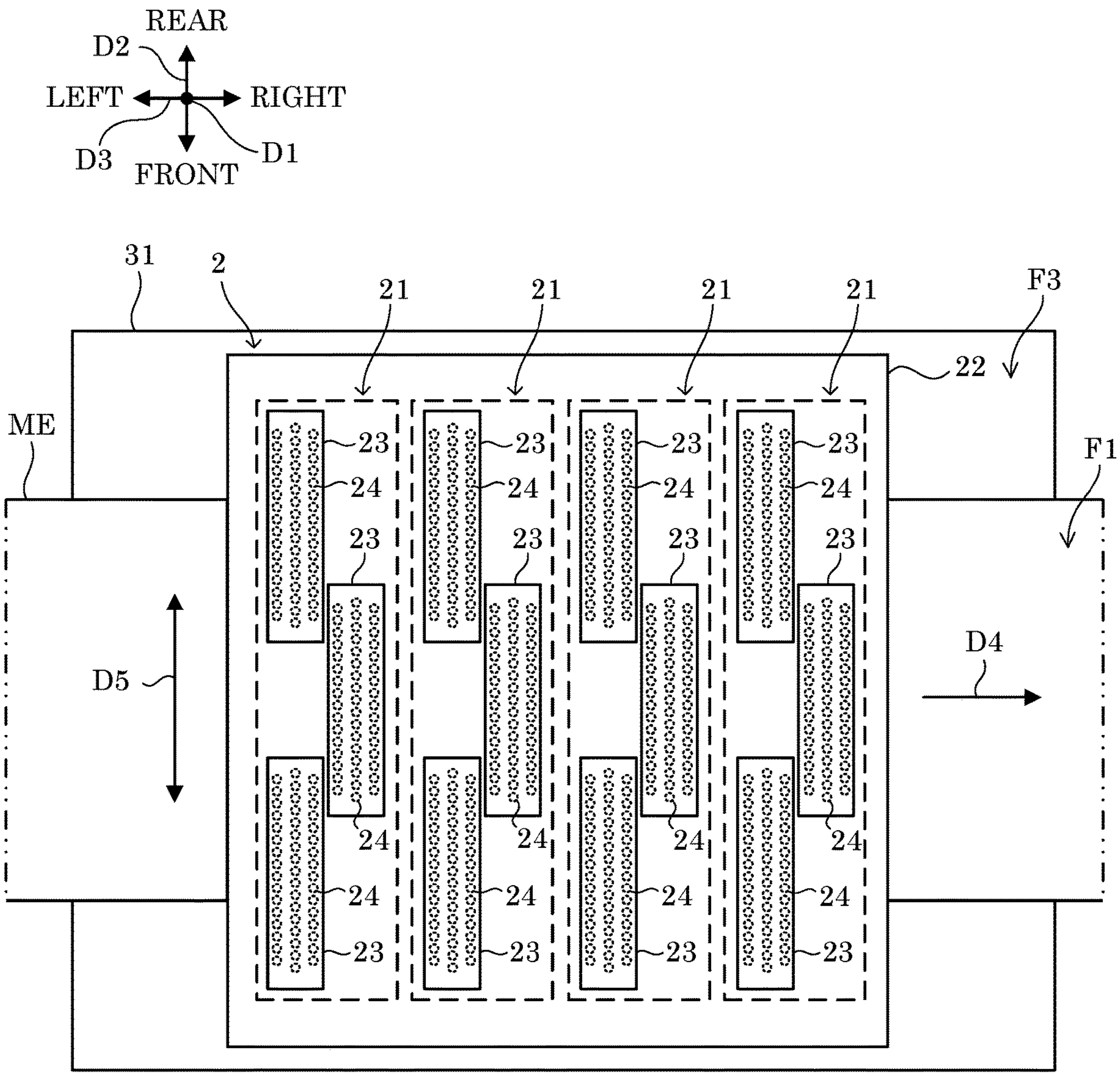
FIG. 2 is a diagram showing a configuration of an image forming portion of the image forming apparatus according to the first embodiment of the present disclosure.

First, a configuration of an image forming apparatus 100 according to a first embodiment of the present disclosure will be described with reference to FIG. 1 and FIG. 2. Herein, FIG. 1 is a cross-sectional view showing the configuration of the image forming apparatus 100. Further, FIG. 2 is a diagram showing an image forming portion 2 from an upper side of the image forming portion 2. It is noted that in FIG. 1, a medium ME is indicated by a dash-dot-dash line.

It is noted that for convenience of descriptions, a vertical direction in a state where the image forming apparatus 100 is installed in a usable state (a state shown in FIG. 1) is defined as an up-down direction D1. In addition, a front-rear direction D2 is defined with a surface of the image forming apparatus 100 on a near side of a sheet surface shown in FIG. 1 being a front surface (front side). In addition, a left-right direction D3 is defined using the front surface of the image forming apparatus 100 in the installed state as a reference.

The image forming apparatus 100 is an inkjet printer capable of forming an image that is based on image data on a belt-like medium ME (see FIG. 1) using an inkjet system. In the image forming apparatus 100, for example, an image is formed using water pigment ink containing pigment and water.

The medium ME has, for example, airtightness. The medium ME is, for example, a plastic film. It is noted that the medium ME does not need to have airtightness. For example, the medium ME may alternatively be paper, cloth, or the like.

As shown in FIG. 1, the image forming apparatus 100 includes a conveying portion 1, the image forming portion 2, a first drying portion 3, and a second drying portion 4.

The conveying portion 1 conveys the medium ME (see FIG. 1).

As shown in FIG. 1, the conveying portion 1 includes a take-up roller 11, a feed roller 12, and a plurality of conveying rollers 13.

A roll of medium ME is attached to the feed roller 12 in a drawable manner. The take-up roller 11 draws out the medium ME from the feed roller 12 and takes up the drawn out medium ME. The feed roller 12 feeds the medium ME along a take-up direction D4 (see FIG. 1) of the medium ME by the take-up roller 11. The plurality of conveying rollers 13 are arranged next to one another along a predetermined conveying path of the medium ME that starts from the feed roller 12 and reaches the take-up roller 11. Each of the conveying rollers 13 conveys the medium ME along the take-up direction D4. The take-up roller 11 is an example of a take-up portion according to the present disclosure. Further, the feed roller 12 is an example of a supply source of a medium according to the present disclosure.

The image forming portion 2 forms an ink image on a first surface F1 (see FIG. 1) of the medium ME drawn out from the feed roller 12 by the take-up roller 11.

As shown in FIG. 1 and FIG. 2, the image forming portion 2 includes four line heads 21 and a head frame 22.

As shown in FIG. 1, the four line heads 21 are arranged next to one another along the conveying path of the medium ME. For example, the medium ME is guided along a horizontal plane by a guide plate 31 (see FIG. 1) of the first drying portion 3 provided on the conveying path of the medium ME. The four line heads 21 are provided opposed to the medium ME on an upper side of the medium ME guided along the horizontal plane. The first surface F1 of the medium ME is a surface of the medium ME opposed to each of the line heads 21. The head frame 22 retains the four line heads 21.

Each of the line heads 21 ejects ink drops toward the first surface F1 of the medium ME drawn out from the feed roller 12 by the take-up roller 11, to thus form an ink image on the first surface F1. The four line heads 21 respectively eject ink drops of different colors. Specifically, each of the line heads 21 ejects ink drops of any of the colors of cyan, magenta, yellow, and black. The line heads 21 are an example of an ejection portion according to the present disclosure.

As shown in FIG. 2, each of the line heads 21 includes three recording heads 23. In each of the line heads 21, the three recording heads 23 are arranged in a staggered pattern along a width direction D5 (see FIG. 2) orthogonal to the take-up direction D4. It is noted that each of the line heads 21 may alternatively include four or more recording heads 23.

Each of the recording heads 23 includes an ink ejection surface opposed to the first surface F1 of the medium ME. A plurality of nozzles 24 (see FIG. 2) are formed on the ink ejection surface. A plurality of rows of nozzles 24 are formed along the take-up direction D4. Each of the nozzles 24 includes an ink ejection outlet for ejecting ink drops onto the first surface F1 of the medium ME.

Each of the line heads 21 controls whether to eject ink from each of the nozzles 24 and an ejection timing thereof in accordance with control signals input from a control portion (not shown). Thus, a color image formed by ink of four colors of cyan, magenta, yellow, and black is formed on the first surface F1 of the medium ME.

The first drying portion 3 heats the medium ME at a position opposed to the four line heads 21 with the medium ME interposed therebetween, and dries the ink ejected onto the first surface F1 of the medium ME (see FIG. 1).

As shown in FIG. 1, the first drying portion 3 includes the guide plate 31 and a first heater 32. The first drying portion 3 is an example of a drying apparatus according to the present disclosure.

The guide plate 31 comes into contact with a second surface F2 (see FIG. 1) of the medium ME drawn out from the feed roller 12 by the take-up roller 11, and guides the medium ME along the conveying path of the medium ME. Further, the guide plate 31 comes into contact with the second surface F2 of the medium ME and transmits thermal energy supplied from the first heater 32 to the medium ME. The second surface F2 of the medium ME is a surface of the medium ME on a back side of the first surface F1. For example, the guide plate 31 comes into contact with the second surface F2 of the medium ME and guides the medium ME conveyed by the conveying portion 1 along the horizontal plane. The guide plate 31 presses the medium ME upwardly. The guide plate 31 is provided opposed to the four line heads 21 with the medium ME interposed therebetween. The guide plate 31 is a plate-like member provided along the horizontal plane. The guide plate 31 is an example of a heat-transfer portion according to the present disclosure.

The first heater 32 supplies thermal energy to the guide plate 31. Specifically, as shown in FIG. 1, the first heater 32 is provided at a position at which it sandwiches the guide plate 31 with the four line heads 21. For example, the first heater 32 irradiates infrared rays toward the guide plate 31. For example, the first heater 32 is a halogen heater. It is noted that the first heater 32 may alternatively be a ceramic heater, an IH heater, or a hot-water heater.

For example, in the image forming apparatus 100, drive of the first heater 32 is controlled using a first temperature sensor (not shown) capable of sensing a surface temperature of the guide plate 31. For example, in the image forming apparatus 100, drive of the first heater 32 is controlled by a control portion (not shown) such that a temperature sensed by the first temperature sensor does not exceed a predetermined first temperature. The first temperature is, for example, 60 degrees.

In the first drying portion 3, thermal energy generated by the first heater 32 is transmitted to the medium ME via the guide plate 31. Thus, the medium ME is heated.

The second drying portion 4 heats the medium ME more on a downstream side of the take-up direction D4 than the four line heads 21, and dries the ink ejected onto the first surface F1 of the medium ME (see FIG. 1).

As shown in FIG. 1, the second drying portion 4 includes a housing 41, a heat-transfer drum 42, and a second heater 43.

The housing 41 houses the heat-transfer drum 42. For example, as shown in FIG. 1, the housing 41 is formed in a box shape having an inlet and outlet of the medium ME on a bottom surface thereof.

The heat-transfer drum 42 comes into contact with the second surface F2 (see FIG. 1) of the medium ME drawn out from the feed roller 12 by the take-up roller 11, and guides the medium ME along the conveying path of the medium ME. Further, the heat-transfer drum 42 comes into contact with the second surface F2 of the medium ME and transmits thermal energy supplied from the second heater 43 to the medium ME. As shown in FIG. 1, the heat-transfer drum 42 is provided more on the downstream side of the take-up direction D4 than the four line heads 21. The heat-transfer drum 42 is a hollow drum-like member having a rotation shaft along the width direction D5. The heat-transfer drum 42 is rotatably supported by the housing 41.

The second heater 43 supplies thermal energy to the heat-transfer drum 42. Specifically, as shown in FIG. 1, the second heater 43 is provided on an inner side of the heat-transfer drum 42. For example, the second heater 43 irradiates infrared rays toward the heat-transfer drum 42. For example, the second heater 43 is a halogen heater. It is noted that the second heater 43 may alternatively be a ceramic heater, an IH heater, or a hot-water heater.

For example, in the image forming apparatus 100, drive of the second heater 43 is controlled using a second temperature sensor (not shown) capable of sensing a surface temperature of the heat-transfer drum 42. For example, in the image forming apparatus 100, drive of the second heater 43 is controlled by a control portion (not shown) such that a temperature sensed by the second temperature sensor does not exceed a predetermined second temperature higher than the first temperature. The second temperature is, for example, 130 degrees.

In the second drying portion 4, thermal energy generated by the second heater 43 is transmitted to the medium ME via the heat-transfer drum 42. Thus, the medium ME is heated. It is noted that the inside of the housing 41 is ventilated by a blast fan (not shown). Thus, a situation where the inside of the housing 41 is filled with water vapors generated by the drying of ink is suppressed.

Incidentally, when a material used for forming the guide plate 31 is selected arbitrarily, abrasion on the surface of the guide plate 31 may progress due to the contact with the medium ME. In addition, when the material used for forming the guide plate 31 is selected arbitrarily, variation may be caused in the temperature distribution on the surface of the guide plate 31. When the variation is caused in the temperature distribution on the surface of the guide plate 31, a pinning property is lowered and ink bleed occurs, with the result that an image quality of an image formed by the image forming apparatus 100 is lowered. In contrast, it is possible to form the guide plate 31 using a material having high abrasion resistance and heat conductivity. In this case, however, the material to be used for forming the guide plate 31 is limited, and manufacturing costs of the guide plate 31 increase.

In contrast, in the image forming apparatus 100 according to the first embodiment of the present disclosure, heat conductivity and abrasion resistance of the guide plate 31 can be improved without limiting the material as will be described below.

[Configuration of Guide Plate 31]

Next, a configuration of the guide plate 31 will be described with reference to FIG. 1 to FIG. 3. Herein, FIG. 3 is a diagram showing a front-side end portion of the guide plate 31 seen from the front side.

Figure 3:
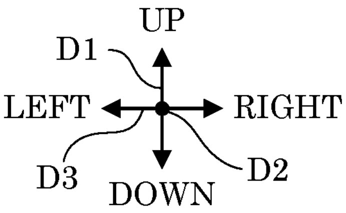
FIG. 3 is a diagram showing a configuration of a guide plate of the image forming apparatus according to the first embodiment of the present disclosure.
Figure 3:
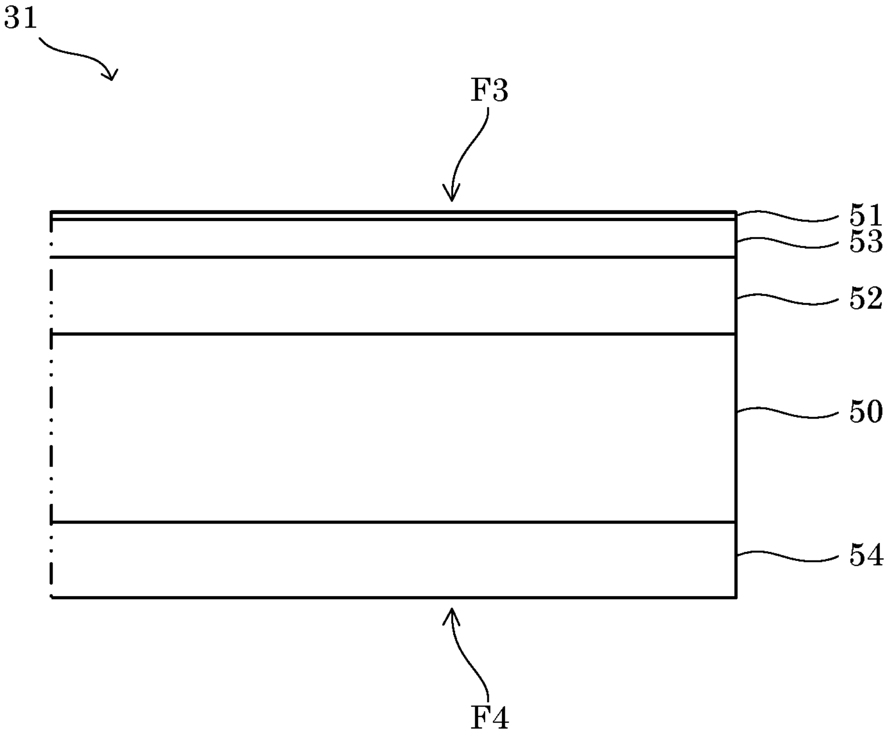

As shown in FIG. 3, the guide plate 31 includes a base material portion 50, a first layer portion 51, a second layer portion 52, a third layer portion 53, and a fourth layer portion 54.

As shown in FIG. 1 and FIG. 3, the base material portion 50 is provided closer to an opposing surface F4 (see FIG. 3) that opposes the first heater 32 than a contact surface F3 (see FIG. 2 and FIG. 3) that comes into contact with the medium ME in the guide plate 31.

For example, the base material portion 50 is formed of metal and has a plate-like shape. For example, the base material portion 50 is formed of stainless steel. It is noted that the base material portion 50 may alternatively be formed of iron, aluminum, or the like. Alternatively, the base material portion 50 may be formed of a material different from metal.

As shown in FIG. 3, the first layer portion 51 forms the contact surface F3. The first layer portion 51 has higher abrasion resistance than the base material portion 50. The first layer portion 51 is formed by an electrolytic plating method using a predetermined plating material.

For example, the first layer portion 51 is formed of chromium. It is noted that the first layer portion 51 may alternatively be formed of a plating material different from chromium, that has higher abrasion resistance than the base material portion 50.

As shown in FIG. 3, the second layer portion 52 is provided between the first layer portion 51 and the base material portion 50. The second layer portion 52 has higher heat conductivity than the base material portion 50. The second layer portion 52 is formed by an electrolytic plating method using a predetermined plating material.

For example, the second layer portion 52 is formed of copper. It is noted that the second layer portion 52 may alternatively be formed of a plating material different from copper, that has higher heat conductivity than the base material portion 50.

As shown in FIG. 3, the third layer portion 53 is provided between the first layer portion 51 and the second layer portion 52. The third layer portion 53 is formed by an electroless plating method using a predetermined plating material.

For example, the third layer portion 53 is formed of nickel. It is noted that the third layer portion 53 may alternatively be formed of a plating material different from nickel.

As shown in FIG. 3, the fourth layer portion 54 forms the opposing surface F4. The fourth layer portion 54 has higher heat conductivity than the base material portion 50. The fourth layer portion 54 is formed by an electrolytic plating method using a predetermined plating material.

For example, the fourth layer portion 54 is formed of copper. It is noted that the fourth layer portion 54 may alternatively be formed of a plating material different from copper, that has higher heat conductivity than the base material portion 50.

As shown in FIG. 3, the second layer portion 52 is formed on an upper surface of the base material portion 50. In addition, the third layer portion 53 is formed on an upper surface of the second layer portion 52. Moreover, the first layer portion 51 is formed on an upper surface of the third layer portion 53. Furthermore, the fourth layer portion 54 is formed on a lower surface of the base material portion 50.

In the guide plate 31, the contact surface F3 is formed by the first layer portion 51 having higher abrasion resistance than the base material portion 50. Thus, abrasion resistance can be improved as compared to a configuration in which the base material portion 50 is used as it is as the guide plate 31.

Also in the guide plate 31, the second layer portion 52 having higher heat conductivity than the base material portion 50 is provided between the first layer portion 51 and the base material portion 50. Thus, heat conductivity can be improved as compared to the configuration in which the base material portion 50 is used as it is as the guide plate 31 and a configuration in which the base material portion 50 having the first layer portion 51 formed on the upper surface thereof is used as the guide plate 31.

Herein, when the base material portion 50 is formed of stainless steel or the like whose heat conductivity is not high, the variation in temperature distribution at the upper portion of the base material portion 50 becomes larger as the thickness of the base material portion 50 increases. Consequently, the thickness of the second layer portion 52 required for canceling the variation in temperature distribution at the upper portion of the base material portion 50 also increases. Therefore, it is desirable to set the thickness of the second layer portion 52 based on the heat conductivity and thickness of the base material portion 50.

For example, when the base material portion 50 is formed of stainless steel and has a thickness of 1 cm (centimeter), the thickness of the second layer portion 52 is desirably set within a range of 8.0 μm (micrometers) to 10.0 μm (micrometers).

The thickness of the first layer portion 51 only needs to be enough to ensure abrasion resistance. For example, in the guide plate 31, the thickness of the first layer portion 51 is set within a range of 0.05 μm (micrometers) to 0.20 μm (micrometers).

Herein, when the second layer portion 52 is formed by the electrolytic plating method, variation may be caused in the layer thickness of the second layer portion 52. In contrast, in the guide plate 31, the third layer portion 53 formed by the electroless plating method is provided between the first layer portion 51 and the second layer portion 52. Thus, the variation in layer thickness of the second layer portion 52 can be cancelled. Consequently, flatness of the contact surface F3 can be improved. It is noted that the second layer portion 52 may alternatively be formed by the electroless plating method. In this case, the guide plate 31 does not need to include the third layer portion 53.

Herein, the variation in layer thickness of the second layer portion 52 becomes larger as the thickness of the second layer portion 52 increases. Consequently, the thickness of the third layer portion 53 required for canceling the variation in layer thickness of the second layer portion 52 also increases. Therefore, it is desirable to set the thickness of the third layer portion 53 based on the thickness of the second layer portion 52.

For example, when the thickness of the second layer portion 52 is set within the range of 8.0 μm (micrometers) to 10.0 μm (micrometers), the thickness of the third layer portion 53 is desirably set within a range of 4.0 μm (micrometers) to 5.5 μm (micrometers).

In the guide plate 31, the fourth layer portion 54 having higher heat conductivity than the base material portion 50 forms the opposing surface F4. Thus, it is possible to suppress the variation in temperature distribution at the lower portion of the base material portion 50 as compared to a configuration in which the lower surface of the base material portion 50 is used as the opposing surface F4. When the variation in temperature distribution at the lower portion of the base material portion 50 is suppressed, the variation in temperature distribution at the upper portion of the base material portion 50 is also suppressed. In other words, by providing the fourth layer portion 54, both the second layer portion 52 and the third layer portion 53 can be thinned. It is noted that the desirable range of the thickness of the second layer portion 52 described above is that in the case where the fourth layer portion 54 is provided.

Herein, the second layer portion 52 and the fourth layer portion 54 are formed at the same opportunity using the same material. In other words, the second layer portion 52 and the fourth layer portion 54 are formed simultaneously by the electrolytic plating method using the same material. Thus, time and effort of a manufacturer who manufactures the guide plate 31 can be reduced as compared to a case where the second layer portion 52 and the fourth layer portion 54 are formed individually.

In this manner, in the image forming apparatus 100, the first layer portion 51 and the second layer portion 52 are stacked on one side of the base material portion 50 included in the guide plate 31. Thus, heat conductivity and abrasion resistance of the guide plate 31 can be improved without limiting the material as compared to the configuration in which the base material portion 50 is used as it is as the guide plate 31.

It is noted that when the first heater 32 is an infrared heater, the guide plate 31 may be applied with a coating material that absorbs infrared rays on the opposing surface F4 thereof. For example, a black coating material that absorbs infrared rays may be applied onto the opposing surface F4 of the guide plate 31. Thus, heat-transfer efficiency from the first heater 32 to the guide plate 31 can be improved.

Alternatively, the second drying portion 4 may include a member having the same configuration as the guide plate 31 in place of the heat-transfer drum 42. In this case, the second drying portion 4 is another example of the drying apparatus according to the present disclosure.

Alternatively, the heat-transfer drum 42 may be plated on a surface thereof. For example, the heat-transfer drum 42 may include any one or a plurality of the first layer portion 51, the second layer portion 52, the third layer portion 53, and the fourth layer portion 54 (see FIG. 3). For example, the heat-transfer drum 42 may include a hollow drum-like base material portion, the second layer portion 52 formed on an outer circumferential surface of the drum-like base material portion, the third layer portion 53 stacked on the second layer portion 52, and the first layer portion 51 stacked on the third layer portion 53. Moreover, a black coating material that absorbs infrared rays may be applied onto an inner circumferential surface of the drum-like base material portion. In this case, the heat-transfer drum 42 is another example of the heat-transfer portion according to the present disclosure.

Incidentally, in the image forming apparatus 100, when the medium ME and the heat-transfer drum 42 come into contact with each other, air may enter between the medium ME and the heat-transfer drum 42. When air enters between the medium ME and the heat-transfer drum 42, adhesion therebetween is lowered to thus lower the heat-transfer efficiency from the heat-transfer drum 42 to the medium ME. In contrast, an image forming apparatus including the heat-transfer drum 42 whose surface has been subjected to a roughening process is known as the related art.

In the image forming apparatus according to the related art described above, however, scratches may be caused on the back surface of the medium ME due to the contact with the roughened surface of the heat-transfer drum 42.

In contrast, in an image forming apparatus 200 according to a second embodiment of the present disclosure, it is possible to suppress scratches to be formed on the back surface of the medium ME as well as suppress lowering of adhesion between the heat-transfer portion such as the heat-transfer drum 42 and the guide plate 31 and the medium ME as will be described below.

Second Embodiment

Figure 4:
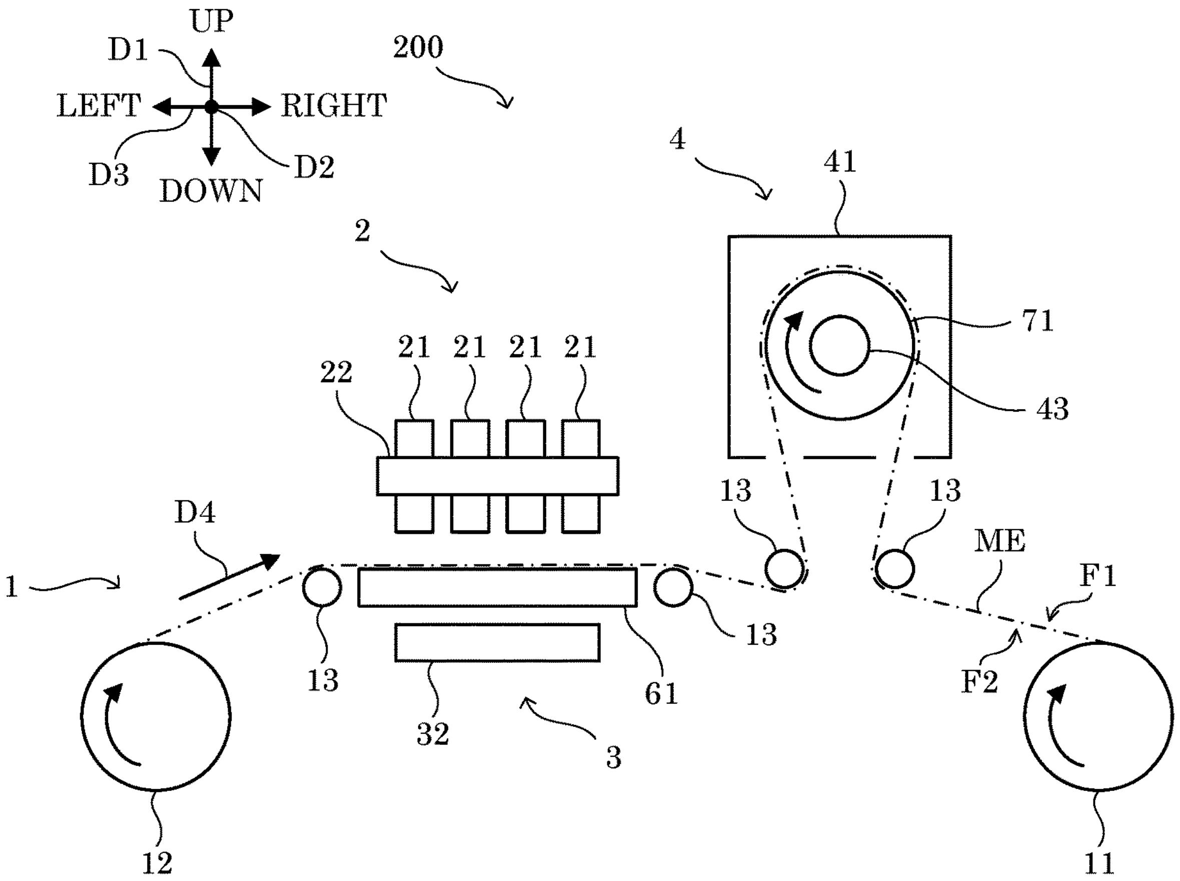
FIG. 4 is a diagram showing a configuration of an image forming apparatus according to a second embodiment of the present disclosure.
Figure 5:
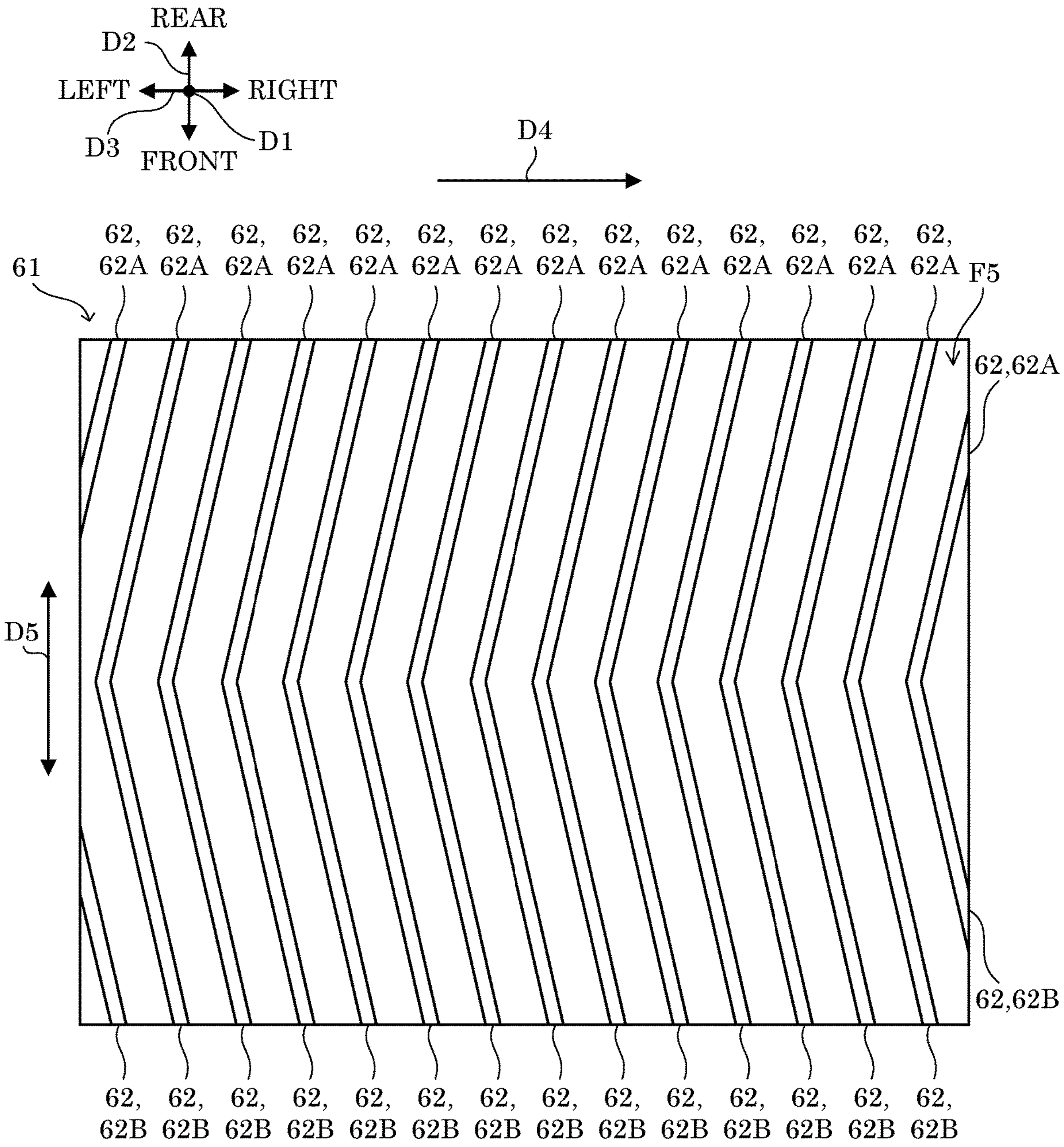
FIG. 5 is a diagram showing a configuration of a guide plate of the image forming apparatus according to the second embodiment of the present disclosure.
Figure 6:
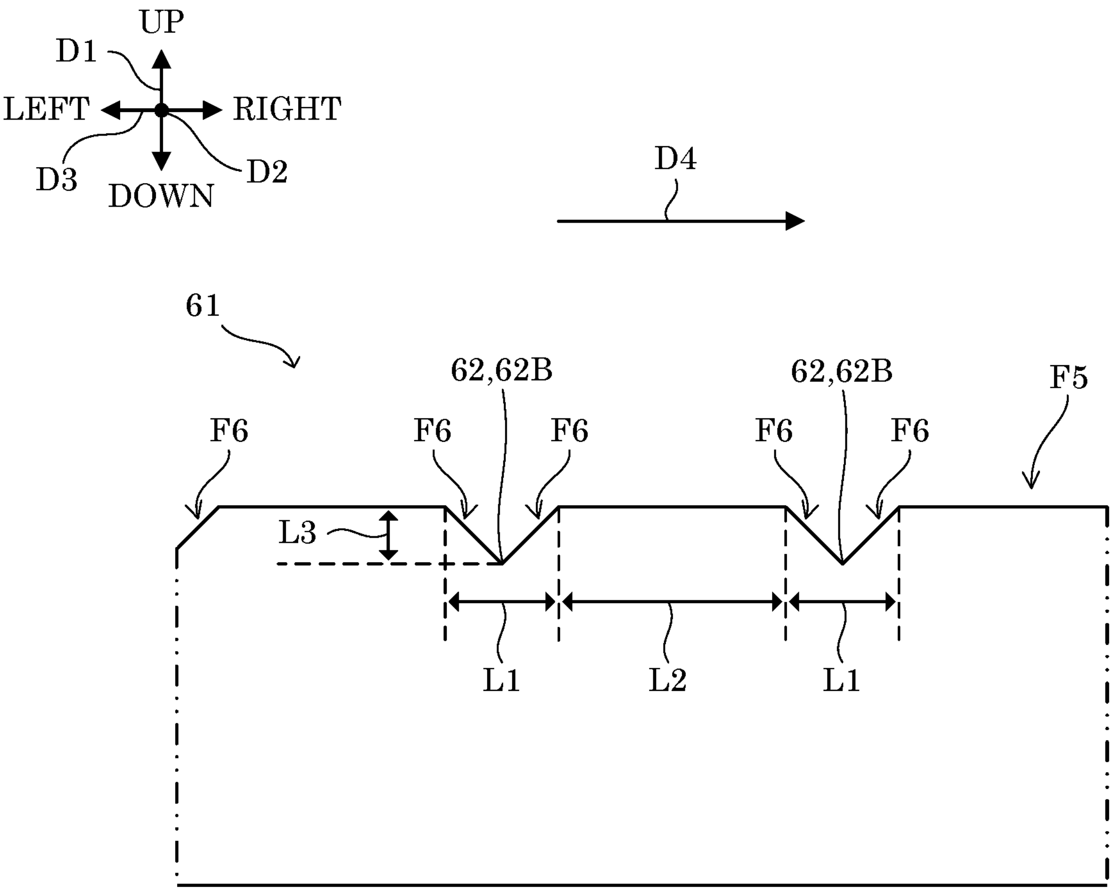
FIG. 6 is a diagram showing the configuration of the guide plate of the image forming apparatus according to the second embodiment of the present disclosure.
Figure 7:
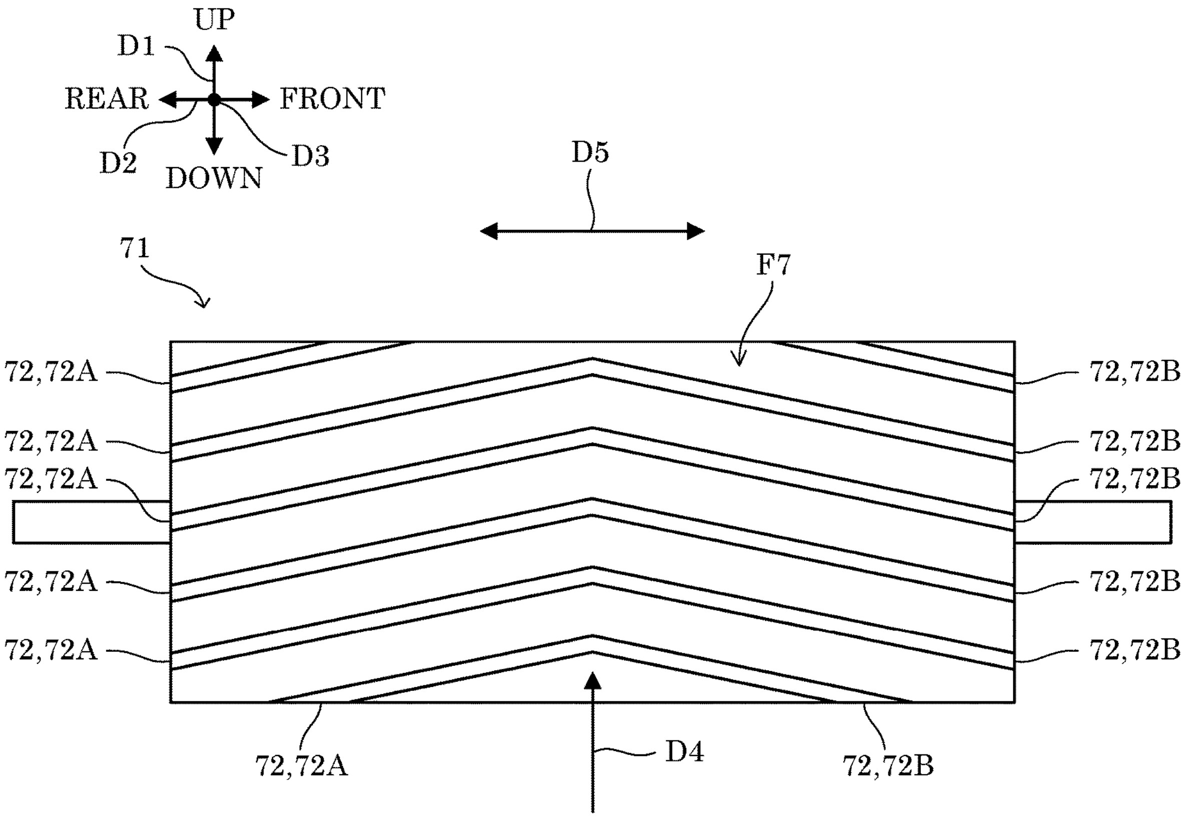
FIG. 7 is a diagram showing a configuration of a heat-transfer drum of the image forming apparatus according to the second embodiment of the present disclosure.
Figure 8:
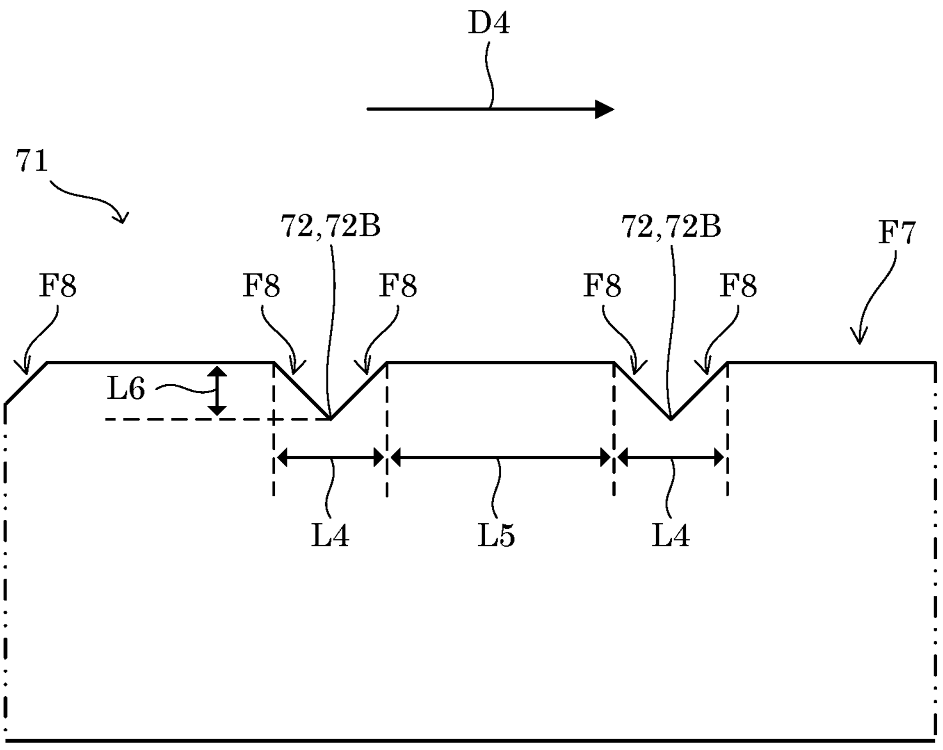
FIG. 8 is a diagram showing the configuration of the heat-transfer drum of the image forming apparatus according to the second embodiment of the present disclosure.

Hereinafter, a configuration of the image forming apparatus 200 according to the second embodiment of the present disclosure will be described with reference to FIG. 4 to FIG. 8. Herein, FIG. 4 is a cross-sectional view showing the configuration of the image forming apparatus 200. Further, FIG. 5 is a diagram showing a guide plate 61 seen from an upper side of the guide plate 61. Further, FIG. 6 is a diagram showing a front-side end portion of the guide plate 61 seen from the front side. Further, FIG. 7 is a diagram showing a heat-transfer drum 71 seen from the left side of the heat-transfer drum 71. Furthermore, FIG. 8 is a diagram showing a front-side end portion of the heat-transfer drum 71 seen from the front side.

As shown in FIG. 4, the image forming apparatus 200 has the same configuration as the image forming apparatus 100 except that the guide plate 61 is provided in place of the guide plate 31 and the heat-transfer drum 71 is provided in place of the heat-transfer drum 42.

The guide plate 61 comes into contact with the second surface F2 (see FIG. 4) of the medium ME drawn out from the feed roller 12 by the take-up roller 11, and guides the medium ME along the conveying path of the medium ME. Moreover, the guide plate 61 comes into contact with the second surface F2 of the medium ME and transmits thermal energy supplied from the first heater 32 to the medium ME. For example, the guide plate 61 comes into contact with the second surface F2 of the medium ME and guides the medium ME conveyed by the conveying portion 1 along the horizontal plane. The guide plate 61 is provided opposed to the four line heads 21 with the medium ME interposed therebetween. The guide plate 61 is a plate-like member provided along the horizontal plane.

For example, the guide plate 61 is formed of metal. By forming the guide plate 61 of metal, the guide plate 61 can be given abrasion resistance and heat conductivity. For example, the guide plate 61 is formed of stainless steel. Alternatively, the guide plate 61 may be formed of iron, aluminum, or the like. It is noted that the guide plate 61 may alternatively be formed of a material different from metal.

As shown in FIG. 5, the guide plate 61 includes a plurality of concave portions 62 that are arranged along the take-up direction D4 of the medium ME by the take-up roller 11 on a contact surface F5 (see FIG. 5) that comes into contact with the medium ME and extend to end portions of the contact surface F5 in the width direction D5 of the medium ME.

Thus, even when air enters between the medium ME and the guide plate 61 at a time the medium ME and the guide plate 61 come into contact with each other, the air can be let out to the one or plurality of concave portions 62. In addition, since each of the concave portions 62 extends to the end portions of the contact surface F5 in the width direction D5, the air that has been let out to the one or plurality of concave portions 62 can be let out to an outer side of the guide plate 61 in the width direction D5. Moreover, the medium ME and the contact surface F5 can be brought into surface contact with each other instead of point contact as compared to a configuration in which the contact surface F5 is subjected to the roughening process. Consequently, it is possible to suppress scratches to be formed on the back surface of the medium ME as well as suppress the lowering of adhesion between the guide plate 61 and the medium ME.

As shown in FIG. 5, the plurality of concave portions 62 include first concave portions 62A extending from a center portion of the contact surface F5 in the width direction D5 to one side thereof in the width direction D5 toward the downstream side of the take-up direction D4, and second concave portions 62B extending from the center portion of the contact surface F5 in the width direction D5 to the other side thereof in the width direction D5 toward the downstream side of the take-up direction D4.

Thus, the medium ME guided by the contact surface F5 comes into contact with edge portions of the first concave portions 62A on the downstream side of the take-up direction D4 to receive a force from the edge portions toward one side (rear side) of the width direction D5, and comes into contact with edge portions of the second concave portions 62B on the downstream side of the take-up direction D4 to receive a force from the edge portions toward the other side (front side) of the width direction D5. Therefore, the medium ME is stretched toward both outer sides of the width direction D5. Consequently, wrinkles caused by the air that has entered between the medium ME and the guide plate 61 can be smoothed out.

For example, as shown in FIG. 5, the first concave portions 62A and the second concave portions 62B are connected at the center portion of the contact surface F5 in the width direction D5. Alternatively, the first concave portions 62A and the second concave portions 62B may be arranged alternately along the center portion of the contact surface F5 in the width direction D5. It is noted that the first concave portions 62A and the second concave portions 62B may each extend in the same direction as the width direction D5.

As shown in FIG. 5, the plurality of concave portions 62 are arranged at regular intervals along the take-up direction D4 on the contact surface F5. Moreover, as shown in FIG. 6, a width L1 (see FIG. 6) of the concave portions 62 is smaller than a distance L2 (see FIG. 6) from one concave portion 62 to another concave portion 62 adjacent thereto.

Thus, a contact area between the medium ME and the contact surface F5 can be increased as compared to a configuration in which the width L1 is the same as or larger than the distance L2. Consequently, it is possible to suppress scratches to be formed on the back surface of the medium ME as well as enhance the adhesion between the guide plate 61 and the medium ME as compared to the configuration in which the width L1 is the same as or larger than the distance L2.

For example, when a pitch of the concave portions 62 (width L1+distance L2) in the take-up direction D4 is set within a range of 0.5 mm (millimeters) to 5.0 mm (millimeters), the width L1 is desirably set within a range of 50 μm (micrometers) to 250 μm (micrometers).

Further, as shown in FIG. 6, each of the concave portions 62 has tilted surfaces F6 (see FIG. 6) that each form an obtuse angle with the contact surface F5.

Thus, it is possible to suppress scratches to be formed on the back surface of the medium ME due to the contact between the medium ME and the edge portions of the concave portions 62 as compared to a configuration in which the tilted surfaces F6 form a right angle or an acute angle with the contact surface F5.

Further, as shown in FIG. 6, the tilted surfaces F6 extend to the bottom of the concave portions 62. Furthermore, as shown in FIG. 6, a depth L3 (see FIG. 6) of the concave portions 62 is smaller than the width L1 (see FIG. 6) of the concave portions 62.

Thus, an angle of a corner portion formed between the tilted surfaces F6 and the contact surface F5 becomes more obtuse than in a configuration in which the depth L3 is the same as or larger than the width L1. Consequently, it is possible to suppress scratches to be formed on the back surface of the medium ME due to the contact between the medium ME and the edge portions of the concave portions 62 as compared to the configuration in which the depth L3 is the same as or larger than the width L1.

For example, when the width L1 is set within the range of 50 μm (micrometers) to 250 μm (micrometers), the depth L3 is desirably set within a range of 25 μm (micrometers) to 200 μm (micrometers).

It is noted that the guide plate 61 may be plated on a surface thereof. For example, the guide plate 61 may include any one or a plurality of the first layer portion 51, the second layer portion 52, the third layer portion 53, and the fourth layer portion 54 (see FIG. 3) according to the first embodiment. For example, the guide plate 61 may include a plate-like base material portion in which the plurality of concave portions 62 are formed on a first surface thereof and the fourth layer portion 54 formed on a second surface of the plate-like base material portion on a back side of the first surface. Moreover, a black coating material that absorbs infrared rays may be applied onto the fourth layer portion 54.

The heat-transfer drum 71 comes into contact with the second surface F2 (see FIG. 4) of the medium ME drawn out from the feed roller 12 by the take-up roller 11, and guides the medium ME along the conveying path of the medium ME. Further, the heat-transfer drum 71 comes into contact with the second surface F2 of the medium ME and transmits thermal energy supplied from the second heater 43 to the medium ME. As shown in FIG. 4, the heat-transfer drum 71 is provided more on the downstream side of the take-up direction D4 than the four line heads 21. The heat-transfer drum 71 is a hollow drum-like member having a rotation shaft along the width direction D5. The heat-transfer drum 71 is rotatably supported by the housing 41.

For example, the heat-transfer drum 71 is formed of metal. By forming the heat-transfer drum 71 of metal, the heat-transfer drum 71 can be given abrasion resistance and heat conductivity. For example, the heat-transfer drum 71 is formed of stainless steel. Alternatively, the heat-transfer drum 71 may be formed of iron, aluminum, or the like. It is noted that the heat-transfer drum 71 may alternatively be formed of a material different from metal.

As shown in FIG. 7, the heat-transfer drum 71 includes a plurality of concave portions 72 that are arranged along the take-up direction D4 of the medium ME by the take-up roller 11 on a contact surface F7 (see FIG. 7) that comes into contact with the medium ME and extend to end portions of the contact surface F7 in the width direction D5 of the medium ME.

Thus, even when air enters between the medium ME and the heat-transfer drum 71 at a time the medium ME and the heat-transfer drum 71 come into contact with each other, the air can be let out to the one or plurality of concave portions 72. In addition, since each of the concave portions 72 extends to the end portions of the contact surface F7 in the width direction D5, the air that has been let out to the one or plurality of concave portions 72 can be let out to an outer side of the heat-transfer drum 71 in the width direction D5. Moreover, the medium ME and the contact surface F7 can be brought into surface contact with each other instead of point contact as compared to a configuration in which the contact surface F7 is subjected to the roughening process. Consequently, it is possible to suppress scratches to be formed on the back surface of the medium ME as well as suppress the lowering of adhesion between the heat-transfer drum 71 and the medium ME.

As shown in FIG. 7, the plurality of concave portions 72 include first concave portions 72A extending from a center portion of the contact surface F7 in the width direction D5 to one side thereof in the width direction D5 toward the upstream side of the take-up direction D4, and second concave portions 72B extending from the center portion of the contact surface F7 in the width direction D5 to the other side thereof in the width direction D5 toward the upstream side of the take-up direction D4.

Moreover, the heat-transfer drum 71 receives a rotational driving force supplied from a drive source such as a motor (not shown) to rotate at a circumferential speed higher than a take-up speed of the medium ME by the take-up roller 11 along the take-up direction D4.

Thus, the medium ME comes into contact with edge portions of the first concave portions 72A moving at a higher speed than the medium ME, on the upstream side of the take-up direction D4 to receive a force from the edge portions toward one side (rear side) of the width direction D5, and comes into contact with edge portions of the second concave portions 72B moving at a higher speed than the medium ME, on the upstream side of the take-up direction D4 to receive a force from the edge portions toward the other side (front side) of the width direction D5. Therefore, the medium ME is stretched toward both outer sides of the width direction D5. Consequently, wrinkles caused by the air that has entered between the medium ME and the heat-transfer drum 71 can be smoothed out.

For example, as shown in FIG. 7, the first concave portions 72A and the second concave portions 72B are connected at the center portion of the contact surface F7 in the width direction D5. Alternatively, the first concave portions 72A and the second concave portions 72B may be arranged alternately along the center portion of the contact surface F7 in the width direction D5. It is noted that the first concave portions 72A and the second concave portions 72B may each extend in the same direction as the width direction D5.

As shown in FIG. 7, the plurality of concave portions 72 are arranged at regular intervals along the take-up direction D4 on the contact surface F7. Moreover, as shown in FIG. 8, a width L4 (see FIG. 8) of the concave portions 72 is smaller than a distance L5 (see FIG. 8) from one concave portion 72 to another concave portion 72 adjacent thereto.

Thus, a contact area between the medium ME and the contact surface F7 can be increased as compared to a configuration in which the width L4 is the same as or larger than the distance L5. Consequently, it is possible to suppress scratches to be formed on the back surface of the medium ME as well as enhance the adhesion between the heat-transfer drum 71 and the medium ME as compared to the configuration in which the width L4 is the same as or larger than the distance L5.

For example, when a pitch of the concave portions 72 (width L4+distance L5) in the take-up direction D4 is set within a range of 0.5 mm (millimeters) to 5.0 mm (millimeters), the width L4 is desirably set within a range of 50 μm (micrometers) to 250 μm (micrometers).

Further, as shown in FIG. 8, each of the concave portions 72 has tilted surfaces F8 (see FIG. 8) that each form an obtuse angle with the contact surface F7.

Thus, it is possible to suppress scratches to be formed on the back surface of the medium ME due to the contact between the medium ME and the edge portions of the concave portions 72 as compared to a configuration in which the tilted surfaces F8 form a right angle or an acute angle with the contact surface F7.

Further, as shown in FIG. 8, the tilted surfaces F8 extend to the bottom of the concave portions 72. Furthermore, as shown in FIG. 8, a depth L6 (see FIG. 8) of the concave portions 72 is smaller than the width L4 (see FIG. 8) of the concave portions 72.

Thus, an angle of a corner portion formed between the tilted surfaces F8 and the contact surface F7 becomes more obtuse than in a configuration in which the depth L6 is the same as or larger than the width L4. Consequently, it is possible to suppress scratches to be formed on the back surface of the medium ME due to the contact between the medium ME and the edge portions of the concave portions 72 as compared to the configuration in which the depth L6 is the same as or larger than the width L4.

For example, when the width L4 is set within the range of 50 μm (micrometers) to 250 μm (micrometers), the depth L6 is desirably set within a range of 25 μm (micrometers) to 200 μm (micrometers).

It is noted that the heat-transfer drum 71 may be plated on a surface thereof. For example, the heat-transfer drum 71 may include any one or a plurality of the first layer portion 51, the second layer portion 52, the third layer portion 53, and the fourth layer portion 54 (see FIG. 3) according to the first embodiment. For example, the heat-transfer drum 71 may include a hollow drum-like base material portion in which the plurality of concave portions 72 are formed on an outer circumferential surface thereof and the fourth layer portion 54 formed on an inner circumferential surface of the drum-like base material portion. Moreover, a black coating material that absorbs infrared rays may be applied onto the fourth layer portion 54.

Alternatively, the heat-transfer drum 71 may include the drum-like base material portion, the second layer portion 52 stacked on the outer circumferential surface of the drum-like base material portion, the third layer portion 53 stacked on the second layer portion 52, the first layer portion 51 stacked on the third layer portion 53, and the fourth layer portion 54 formed on the inner circumferential surface of the drum-like base material portion. Moreover, a black coating material that absorbs infrared rays may be applied onto the fourth layer portion 54.

SUPPLEMENTARY NOTES OF DISCLOSURE

Hereinafter, an outline of the disclosure extracted from the embodiments described above will be noted supplementarily. It is noted that the respective configurations and the respective processing functions described in the supplementary notes below can be selected and combined arbitrarily.

<Supplementary Note 1>

A drying apparatus, including: a heater; and a heat-transfer portion which comes into contact with a second surface of a belt-like medium that has been drawn out from a supply source of the medium by a take-up portion which takes up the medium, to transmit thermal energy supplied from the heater to the medium, the second surface being a surface on a back side of a first surface of the medium onto which ink is ejected, in which the heat-transfer portion includes a base material portion which is provided closer to an opposing surface that opposes the heater than a contact surface that comes into contact with the medium, a first layer portion which forms the contact surface and has higher abrasion resistance than the base material portion, and a second layer portion which is provided between the first layer portion and the base material portion and has higher heat conductivity than the base material portion.

<Supplementary Note 2>

The drying apparatus according to supplementary note 1, in which the second layer portion is formed by an electrolytic plating method, and the heat-transfer portion includes a third layer portion which is provided between the first layer portion and the second layer portion and is formed by an electroless plating method.

<Supplementary Note 3>

The drying apparatus according to supplementary note 2, in which the heat-transfer portion includes a fourth layer portion which forms the opposing surface and has higher heat conductivity than the base material portion.

<Supplementary Note 4>

The drying apparatus according to supplementary note 3, in which the second layer portion and the fourth layer portion are formed at a same opportunity using a same material.

<Supplementary Note 5>

The drying apparatus according to supplementary note 4, in which the first layer portion is formed of chromium, the second layer portion and the fourth layer portion are formed of copper, and the third layer portion is formed of nickel.

<Supplementary Note 6>

The drying apparatus according to any one of supplementary note 1 to supplementary note 5, in which the heater irradiates infrared rays toward the heat-transfer portion, and the opposing surface of the heat-transfer portion is applied with a coating material that absorbs infrared rays.

<Supplementary Note 7>

An image forming apparatus, including: the drying apparatus according to any one of supplementary note 1 to supplementary note 6; the take-up portion; and an ejection portion which ejects ink toward the first surface of the medium drawn out from the supply source.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A drying apparatus, comprising:

a heater; and a heat-transfer portion which comes into contact with a second surface of a belt-like medium that has been drawn out from a supply source of the medium by a take-up portion which takes up the medium, to transmit thermal energy supplied from the heater to the medium, the second surface being a surface on a back side of a first surface of the medium onto which ink is ejected, wherein the heat-transfer portion includes a base material portion which is provided closer to an opposing surface that opposes the heater than a contact surface that comes into contact with the medium, a first layer portion which forms the contact surface and has higher abrasion resistance than the base material portion, and a second layer portion which is provided between the first layer portion and the base material portion and has higher heat conductivity than the base material portion.

2. The drying apparatus according to claim 1, wherein the second layer portion is formed by an electrolytic plating method, and the heat-transfer portion includes a third layer portion which is provided between the first layer portion and the second layer portion and is formed by an electroless plating method.

3. The drying apparatus according to claim 2, wherein the heat-transfer portion includes a fourth layer portion which forms the opposing surface and has higher heat conductivity than the base material portion.

4. The drying apparatus according to claim 3, wherein the second layer portion and the fourth layer portion are formed at a same opportunity using a same material.

5. The drying apparatus according to claim 4, wherein
the first layer portion is formed of chromium,
the second layer portion and the fourth layer portion are formed of copper, and
the third layer portion is formed of nickel.

6. The drying apparatus according to claim 1, wherein
the heater irradiates infrared rays toward the heat-transfer portion, and
the opposing surface of the heat-transfer portion is applied with a coating material that absorbs infrared rays.

7. An image forming apparatus, comprising:
the drying apparatus according to claim 1;
the take-up portion; and
an ejection portion which ejects ink toward the first surface of the medium drawn out from the supply source.

* * * * *